July 25, 1967  M. C. HEMSWORTH  3,332,238
ROTARY REGENERATOR FOR GAS TURBINE POWERPLANT
Filed Dec. 29, 1965  6 Sheets-Sheet 3

Fig.3

INVENTOR.
MARTIN C. HEMSWORTH
BY
George R. Powers
ATTORNEY

INVENTOR.
MARTIN C. HEMSWORTH
BY
George R. Powers
ATTORNEY

July 25, 1967  M. C. HEMSWORTH  3,332,238
ROTARY REGENERATOR FOR GAS TURBINE POWERPLANT
Filed Dec. 29, 1965  6 Sheets-Sheet 5
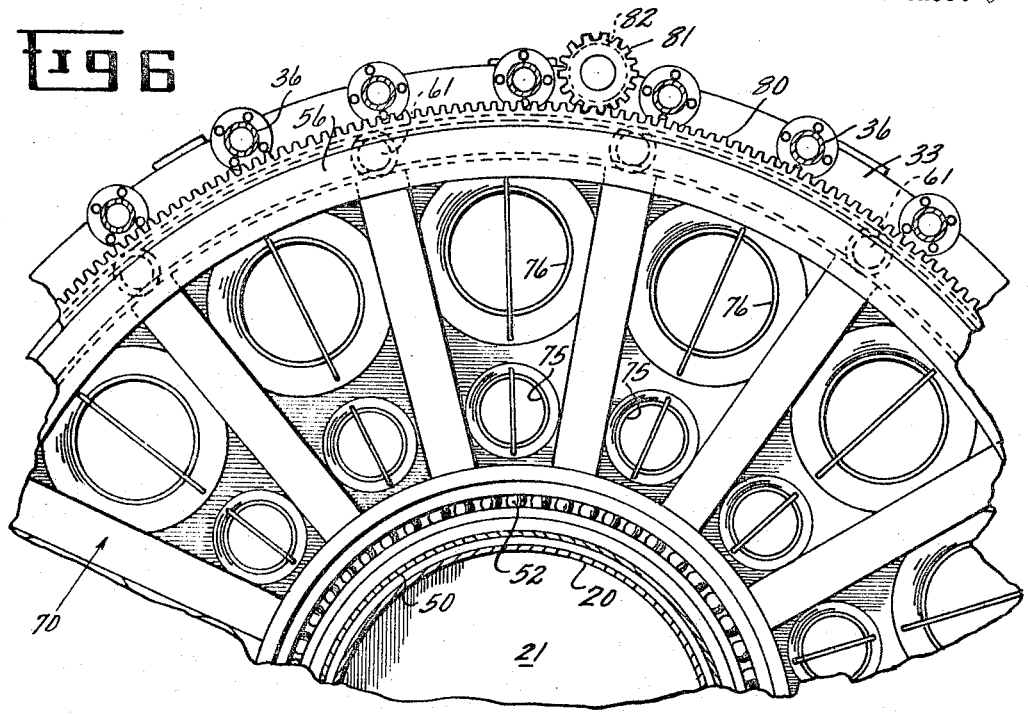
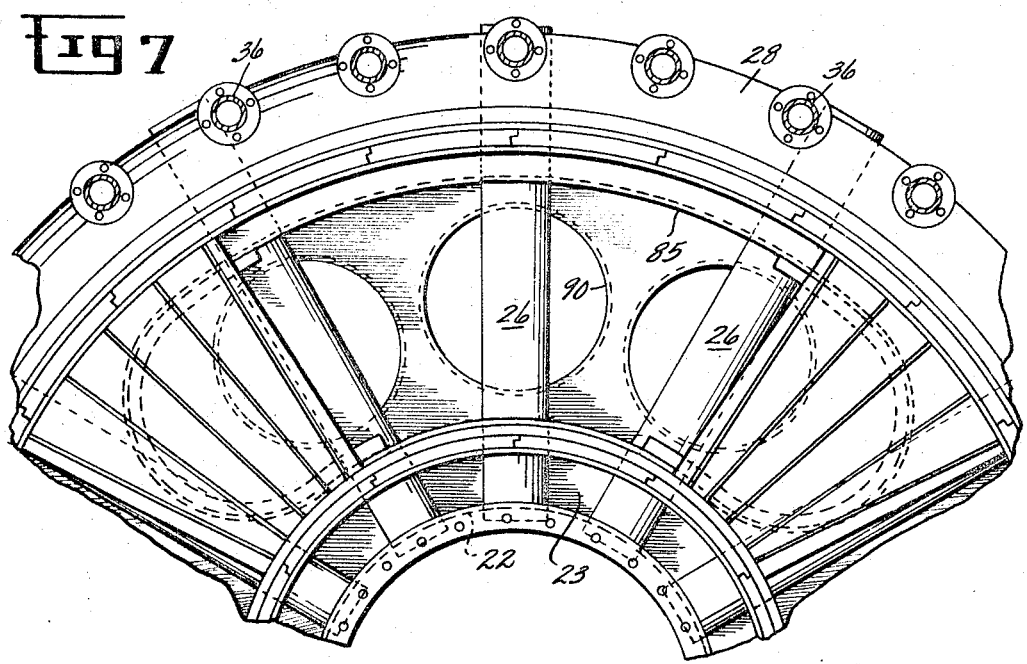
INVENTOR.
MARTIN C. HEMSWORTH
BY
George R. Powers
ATTORNEY

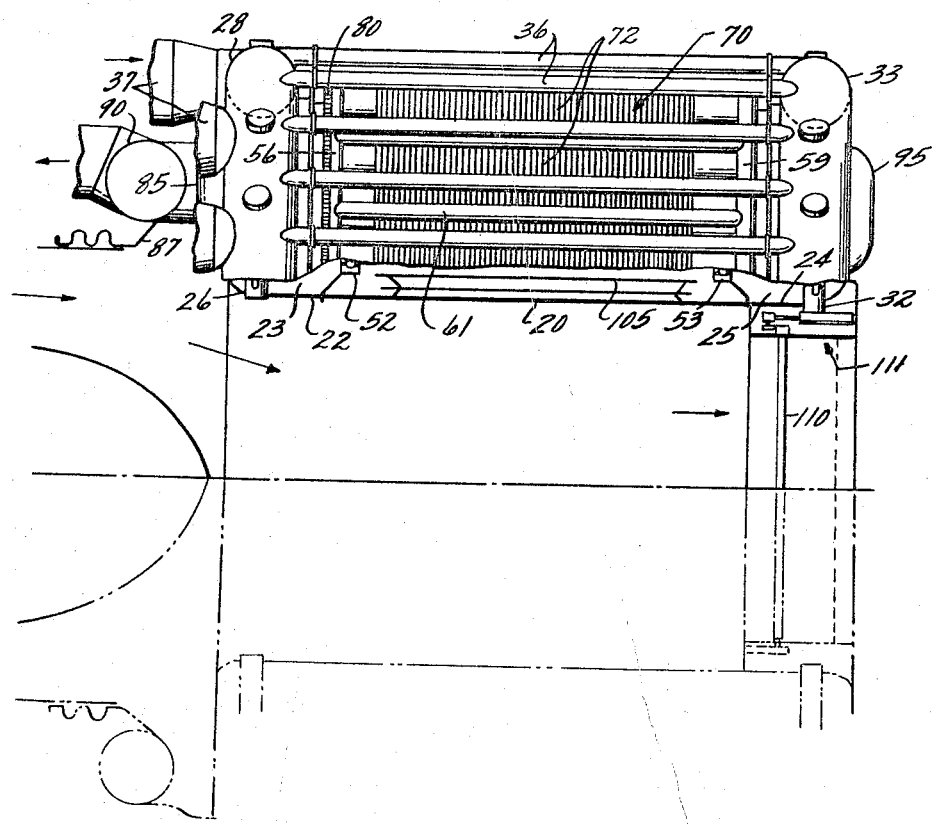

3,332,238
ROTARY REGENERATOR FOR GAS TURBINE
POWERPLANT
Martin Carl Hemsworth, Cincinnati, Ohio, assignor to
General Electric Company, a corporation of New York
Filed Dec. 29, 1965, Ser. No. 517,415
7 Claims. (Cl. 60—39.51)

This invention relates to rotary regenerators for gas turbine power-plants and, more particularly, to an improved structural arrangement for such regenerators, the structural arrangement being characterized by a high degree of dimensional stability during powerplant operation.

It has been proposed in the past that gas turbine powerplants be provided with regenerators or recuperators for the purpose of reducing fuel consumption. More particularly, regenerators and recuperators are used to recover thermal energy by using the hot exhaust gases to preheat the air supplied to the combustor. From a thermodynamic viewpoint, a regenerative cycle in which the hot exhaust gases and the relatively cool compressor discharge air are alternately directed through a heat exchange matrix is an extremely effective means for lowering the specific fuel consumption, which is the rate of fuel consumption per unit of power output. In a regenerator, both the hot combustion products and the cool compressed air flow through the same heat exchange passages, but at different times for any one passage. The heat absorbed within any heat exchange passage from the hot combustion products during one time period is transferred during another time period to the cool compressed air. Unlike recuperative arrangements in which the two gas streams are confined to discrete flow passages, it is essential in regenerators that there be at least some moving elements in order to provide the alternating flow. Various regenerative approaches proposed in the past have included rotary regenerators in which the heat exchange matrix is rotated about an axis so as to move relative to stationary ducting which conducts the hot and cold gases to and from the heat exchange matrix.

With the compressor discharge air at a much higher pressure than the exhaust gases, there is a tendency in rotary regenerators for leakage to occur between the relatively rotating elements, the compressed air leaking either into the hot gas stream or to atmosphere. When such leakage occurs, there is a loss to the system of the energy consumed in compressing the leakage air. It will thus be obvious that a significant amount of leakage can substantially reduce or even eliminate the increased thermal efficiency which otherwise would be obtained by use of the rotary regenerator. In addition, significant leakage can reduce substantially the total power output of the gas turbine powerplant. Accordingly, it is extremely desirable that a rotary regenerator be constructed such that this leakage is minimized. It is, of course, apparent to those skilled in the art that effective sealing means are called for in this situation, and a particularly efficient sealing arrangement for such rotary regenerators is described and claimed by a copending patent application entitled, Means for Reducing Leakage in Rotary Regenerators, Ser. No. 517,414, filed on Dec. 29, 1965, in the names of Francis J. Paradise and Thomas N. Hull, Jr., and assigned to assignee of this invention.

Even when provided with highly effective sealing arrangements such as that of the Paradise et al. patent application, leakage in regenerators constructed in accordance with the prior art may be excessive. To understand the reasons for such leakage, some consideration must be given to the condition of the various regenerator elements during operation. As the rotating elements pass through the separate streams of gas, they are first heated by the exhaust gases, which typically are in the range of 1000° F.–1500° F., and are then cooled as they heat the compressed air, which typically is in a temperature range of 300° F.–700° F. Therefore, since the rotating portion of a rotary regenerator is typically rotated at speeds up to one hundred revolutions per minute, it will be readily appreciated that the elements exposed to the hot and cold gases will repeatedly expand and contract, or at least attempt to, in response to the changes in temperature. For the stationary portions of a typical rotary regenerator, however, the situation is substantially different; while the different stationary elements may be at widely varying temperatures, each element is generally subjected to a fairly uniform operating temperature. Finally, it should be recognized that a rotary regenerator is conventionally assembled with all elements at a temperature far below normal operating conditions, 65° F. being a representative assembly temperature. With these points in mind, it will be obvious to those skilled in the art that even the most accurate and close-running seal assemblies at assembly may not be entirely effective in conventional rotary regenerators where, after being assembled at ambient temperature, different elements operate at widely different and even cyclicly varying temperatures. In other words, some elements expand during operation while others contract and still others undergo no changes, the seal clearances almost invariable suffering. As a result, excessive leakage often occurs and the thermal efficiency is far below that which is desired.

One approach to the leakage problem is to restrain thermal expansion and contraction and thereby maintain close seal clearances. In actual practice however, there are several disadvantages to this approach. First of all, with normal expansion and contraction restrained, the elements of the regenerator are subjected to undesirable thermal stresses. In time, these stresses may cause damage to, or even failure of, the regenerator. For example, repeated and cyclicly varying stresses in the rotating portion of a rotary regenerator may eventually cause fatigue and cracking of the various elements. As a result of even minor cracking, leakage can again become a significant problem. Secondly, efforts to restrain expansion and contraction by strengthening the elements generally result in substantial increases in weight. For aircraft powerplants in particular and other applications in which weight is a prime consideration, added weight is generally undesirable. For example, in an aircraft, the added power required to propel the extra weight may more than offset the savings in specific fuel consumption. Stated differently, the total fuel required may increase in view of significantly increased weight even though the specific fuel consumption is decreased.

It is, therefore, an object of this invention to provide for gas turbine powerplants and improved and highly efficient rotary regenerator, Another object of this invention is to provide for gas turbine powerplants a rotary regenerator characterized by a high degree of dimensional stability during powerplant operation.

Yet another object is to provide an improved rotary regenerator capable of maintaining close seal clearances throughout operation.

A further object of this invention is to provide a rotary regenerator having low leakage without having substantial thermal stresses.

A still further object is to provide an improved rotary regenerator which is both relatively lightweight and substantially free of thermal stresses.

Briefly stated, in carrying out the invention in one form, the structural supporting elements of both the stationary and the rotating portions of a rotary regenerator for a gas turbine powerplant are provided with interconnected fluid flow passages therein. These interconnected passages form at least a portion of the manifold means for supplying relatively cool compressor discharge air to the heat exchange passages of the regenerator. As a result, the structural supporting elements of the stationary support structure and the rigid rotor are maintained at a substantially uniform temperature by the compressed air flowing therethrough. Accordingly, thermal expansion and contraction are minimized without using heavy elements and high stress levels.

By a further aspect of the invention, flexible, axially extending heat exchange units are carried by the rigid rotor, the heat exchange units being secured to the rotor only at their ends. Thus, while the overall lengths of the heat exchange units are substantially fixed, the units can flex freely in response to the temperature changes experienced as the units move through the hot and cold gas streams in the regenerator. Consequently, no significant stress levels are present in the heat exchange units during power-plant operation. By a still further aspect of the invention, suitable sealing means are provided between the stationary and rotating portions of the regenerator for preventing leakage therebetween.

While the invention is distinctly claimed and is particularly pointed out in the claims appended hereto, the invention, both as to organization and content, will be better understood and appreciated, along with other objects and features thereof, from the following detailed description when taken in conjunction with the drawings, in which:

FIG. 3 is a view of the lower half of the rotary regenerator as viewed in FIG. 1;

FIG. 6 is a view taken along viewing line 6—6 of FIG. 2;

FIG. 7 is a view taken along viewing line 7—7 of FIG. 2; and

FIG. 8 is a cross-sectional view of a modified rotary regenerator incorporating this invention, the regenerator being sized for efficient part-power-operation.

Figure 1:
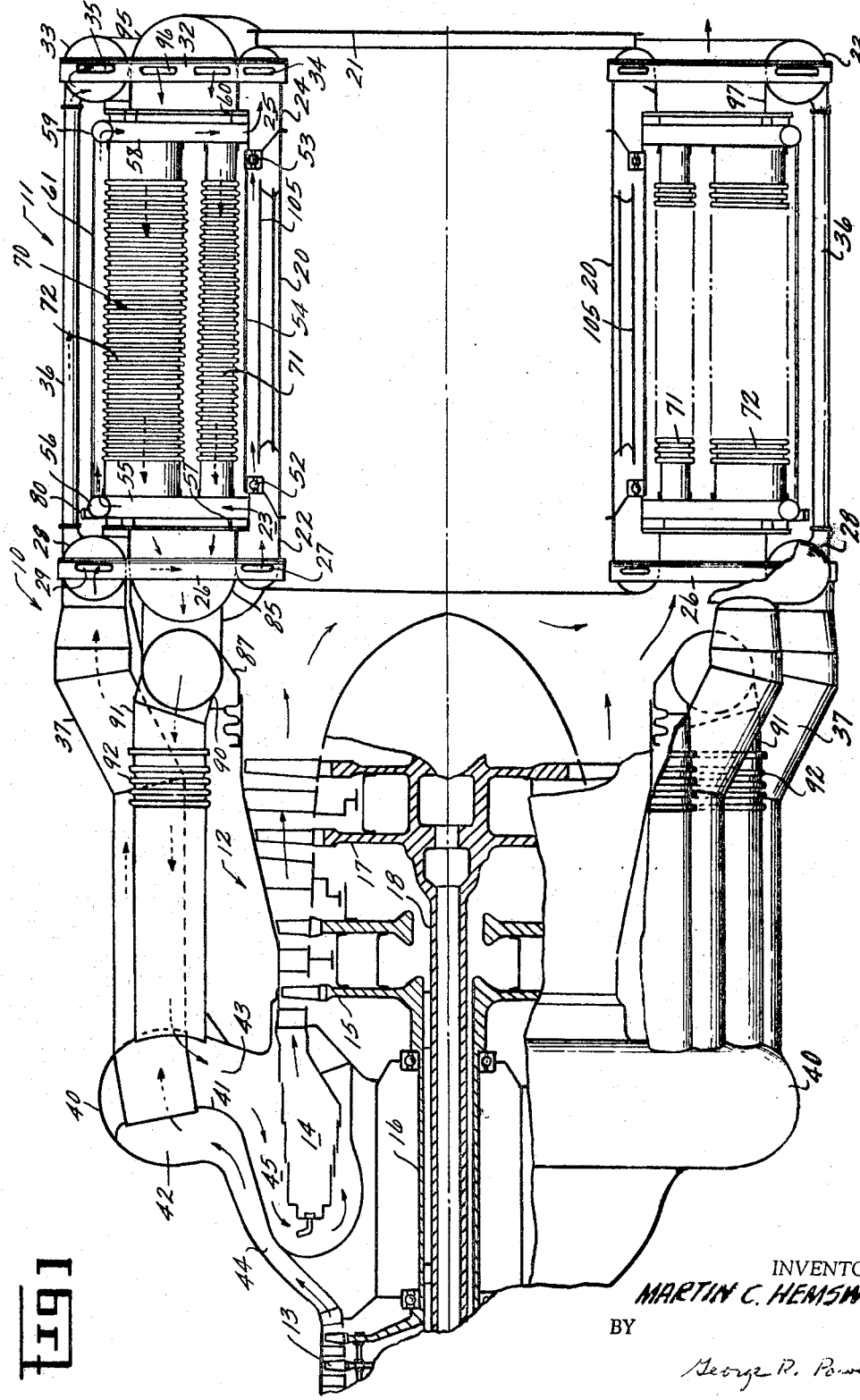
FIG. 1 is a cross-sectional view of a gas turbine powerplant including a rotary regenerator incorporating this invention.

With reference to FIG. 1, a gas turbine powerplant 10 having a rotary regenerator 11 constructed in accordance with this invention is illustrated. In addition to the rotary regenerator 11, the particular powerplant illustrated includes a gas generator 12 comprising a multiple stage axial flow compressor 13, a combustor 14, and a gas generator turbine 15 arranged in axially spaced relationship, the rotor of the turbine 15 driving the rotor of the compressor 13 through a hollow axial shaft 16. A power turbine 17 is located axially downstream of the gas generator turbine 15 and drives a load through a shaft 18 coaxially mounted for rotation within the shaft 16 although of course a rearwardly extending shaft could be used. The shaft 18 may, for example drive a propeller to produce thrust for aircraft propulsion, in which case the gas turbine powerplant is commonly referred to as being a "turboprop" engine. As this description proceeds, it will become obvious that the gas turbine structure just described is illustrative only and that the invention is equally applicable to other arrangements, including "turboshaft" engines in which the power turbine 17 is used to drive loads other than propellers.

Before turning attention to the detailed construction and operation of the rotary regenerator 11, it will be well to outline briefly, with reference to FIG. 1, the principal components of the regenerator and its general mode of operation. Accordingly, there are three principal components: a stationary supporting structure; a rotor assembly; and means for supplying cool compressor discharge air and hot exhaust products to and from the rotor assembly. More particularly, the stationary supporting structure A includes a support member 20 upon which a rigid rotor B is mounted for rotation, the rigid rotor B carrying an annular heat exchange array 70. The heat exchange array 70 is comprised of a plurality of circumferentially spaced heat exchange units 71 and 72 each forming an axial passageway between the upstream and downstream ends of the rotor B. The stationary structure A supports headers 85 and 95 at the upstream and downstream ends, respectively, of the rotor 13, the headers communicating with the heat exchange units forming a first arcuate portion of heat exchange array 70. A second arcuate portion of the heat exchange array 70 is connected to the discharge portion of the power turbine 17 by an exhaust duct 87 and to atmosphere by an exhaust duct 97. Further, manifold means comprising in part ducts 37 supply compressor discharge air to the header 95, and similar manifold means including ducts 91 return compressor discharge air from the header 85 to the combustor 14. Finally, suitable means 80–82 are provided for rotating the rotor B such that the heat exchange units forming the first and second arcuate portions of the heat exchange array 70 are continually changed.

The general mode of operation will now be clear. Hot exhaust products flow through the passageways of the heat exchange units of the second arcuate portion of the array 70 to transfer heat hereto, the heat then being transferred to the compressed air as the normal rotation of the rotor B carries the units from the second to the first arcuate portion of the heat exchange array 70. In accordance with one respect of the present invention, the structural supporting elements of both the stationary structure A and the rotor B are provided with interconnected fluid flow passages therein, the passages forming a portion of the manifold means interconnecting the ducts 37 and the header 95. The cool compressed air maintains the supporting elements at a substantially uniform temperature, thereby minimizing thermal expansion and contraction.

Turning attention now to FIGS. 1–5, and 7, the detailed construction of the rotary regenerator 11 will be described. The rotary regenerator 11 includes a generally cylindrical support member 20 located coaxially downstream of the power turbine 17, the downstream end of the fabricated support member 20 being closed by a cover plate 21. The upstream end of the support member 20 is comprised of an annular element 22 having a U-shaped configuration in cross-section such that an annular channel 23 opening in the downstream direction is formed thereby. A similar annular element 24 comprising the downstream end of the cylindrical support member 20 forms a similar annular channel 25 opening in the upstream direction. As will be noted from the figures, these channels are closed by elements not yet described; accordingly, it will be appropriate to refer to these channels as annular plenums 23 and 25. The cylindrical support member 20, including the elements 22 and 24, is actually the inner portion of an annular stationary support frame which includes a plurality of hollow struts 26 secured to an extending outwardly from the annular element 22 of the support member 20, the struts 26 having openings 27 therein communicating with the plenum 23. The circumferentially spaced struts 26 are secured at their outer ends to a hollow annulus 28, openings 29 providing communication between the struts 26 and the annulus 28. A similar plurality of hollow struts 32 are secured to and extend outwardly from the annular element 24 to an annulus 33, the struts 32 having openings 34 and 35 therein communicating with the plenum 25 and the annulus 33, respectively. The upstream and downstream annuli 28 and 33 are interconnected by a plurality of circumferentially spaced, axial ducts 36 which provide fluid flow communication between the annuli 28 and 33. Another plurality of circumferentially spaced ducts 37 interconnect and provide communication between the upstream annulus 28 and the discharge portion of the compressor 13. More particularly, as shown by FIG. 1, an extraction annulus 40 surrounds the gas generator 12 outwardly of the combustor 14. The extraction annulus 40, a relatively rigid support member, is divided by a circumferential partition 41 into two annular sections 42 and 43. The upstream annular section 42 is connected to the high pressure end of the compressor 13 by a circumferential diffusing duct 44, and the downstream annular section 43 is connected to the combustor 14 by a duct 45. The axial ducts 37 interconnect the upstream annular section 42 of the extraction annulus 40 and the upstream annulus 28, in this manner providing fluid flow communication between the compressor 13 and the annulus 28. The elements discussed thus far, the cylindrical support member 20, the struts 26 and 32, the annuli 28 and 33, the ducts 36 and 37, and the extraction annulus 40, are all substantially rigid members rigidly interconnected to form a rigid, annular support frame for the rotary regenerator 11. In addition, the elements are in fluid communication such that compressor discharge air can flow through all of the elements in a manner which will be described at a later point in this specification.

With attention now being directed to FIGS. 1–3 and 6, the rotatable portion of the rotary regenerator 11 will be described. The cylindrical support member 20 has frusto-conical bearing supports 50 and 51 thereon adjacent its upstream and downstream ends, respectively, carrying bearings 52 and 53 upon which a cylindrical shell 54 is mounted for rotation about the cylindrical support member 20. Immediately upstream of the bearing 52, a plurality of hollow struts 55 extend radially outward from the cylindrical shell 54 and are joined at their outer ends to an annulus 56, the circumferentially spaced struts 55 providing fluid communication between the annular plenum 23 and the annulus 56. As pointed out previously, the annular plenum 23 is substantially enclosed by the U-shaped annular element 22, the bearing support 50, the bearing 52, the cylindrical shell 54, and a suitable annular seal 57 between the annular element 22 and the cylindrical rotor shell 54. Immediately downstream of the bearing 53, another plurality of hollow struts 58 extend radially outward from the shell 54 and are joined at their outer ends to an annulus 59, the struts 58 providing fluid flow communication between the plenum 25 and the annulus 59. It will also be noted that the plenum 25 is substantially enclosed in a manner similar to the plenum 23, a circumferential seal 60 sealing between the shell 54 and the annular element 24. To complete the support structure of the rotor assembly, the annuli 56 and 59 are interconnected by a plurality of circumferentially spaced, axial ducts 61 which provide fluid flow communication between the annuli. As in the case of the support elements comprising the stationary support frame, the support elements comprising the rotor assembly are substantially rigid members interconnected to form a rigid rotor assembly. Furthermore, it will be shown that these rotor support elements are in fluid communication with each other and with the support frame elements.

With attention still directed to FIGS. 1–3 and 6, and annular heat exchange array 70 is carried by the rotor assembly, the array 70 comprising inner and outer rows of axially extending, circumferentially spaced heat exchange units surrounding the cylindrical shell 54. The heat exchange units comprise ducts 71 and 72 arranged in radially spaced pairs, one pair being located between each pair of adjacent radial struts 55 and, at the other end of the rotor, struts 58. Further, support members 73 interconnect the upstream ends of the ducts 71 and 72 to the cylindrical shell 54, the struts 55, and the annulus 56. Similar support members interconnect the downstream ends of the ducts 71 and 72 to the shell 54, the struts 58 and the annulus 59. In this manner, fluid flow between the upstream and downstream ends of the rotor assembly can occur only through the ducts 71 and 72; the support members preventing axial leakage between the ducts 71 and 72 in addition to supporting the ends of the ducts. To prevent stresses during regenerative operation, the ducts 71 and 72, are corrugated so as to permit free expansion and contraction without altering the overall length of the ducts 71 and 72, which is of course substantially uniform due to the dimensional stability of the rotor structure.

Figure 2:
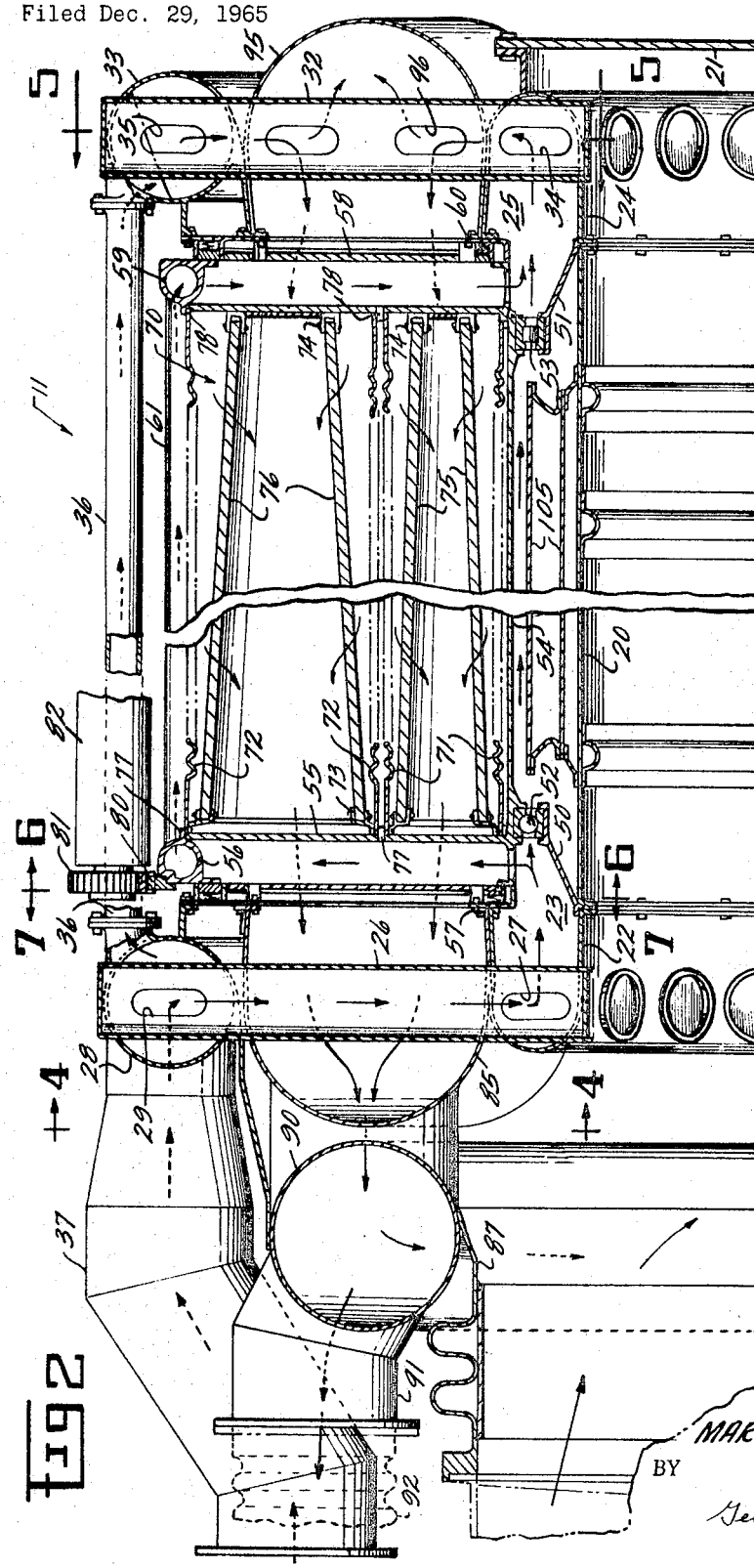
FIG. 2 is a view of the upper half of the rotary regenerator as viewed in FIG. 1.

To provide the heat exchange function, heat exchange matrices 75 and 76 are located within the ducts 71 and 72, respectively. Each of the matrices 75 and 76 is comprised of a plurality of layers of wire screen material formed into a conical and ellipsoidal shape to obtain maximum surface area in a minimum space, the downstream ends of the matrices 75 and 76 being closed such that flow through the matrices is as shown by the arrows of FIGS. 2 and 3. To prevent stresses, the matrices are secured only to the upstream ends of the ducts 71 and 72, the relatively small, downstream ends of the matrices being supported concentrically with respect to the ducts 71 and 72 by supports 74 respectively, which allow axial movement of the matrices relative to the ducts. To provide uniform flow within the ducts 71 and 72, splitters 79 divide the streams of gas entering the ducts.

It will be seen in FIGS. 2 and 6 that a ring gear 80 is carried by the upstream annulus 56, a pinion 81 meshing therewith. By suitable means, such as an electric motor 82, the pinion 81 drives the ring gear 80 and hence the entire rotor assembly at a desired speed of rotation. It will, of course, occur to those skilled in the art that other drive arrangements could be used. For example, the rotor assembly could be geared to the gas generator turbine 15 or power turbine 17 and be driven therefrom instead of being driven by the electric motor 82. In any event, it should be noted that the speed of the rotor assembly of the rotary regenerator 11 is quite low, generally less than 100 r.p.m., as compared with the speeds of the turbines 15 and 17, which may rotate at speeds up to 18,000 r.p.m. and even higher.

Figure 4:
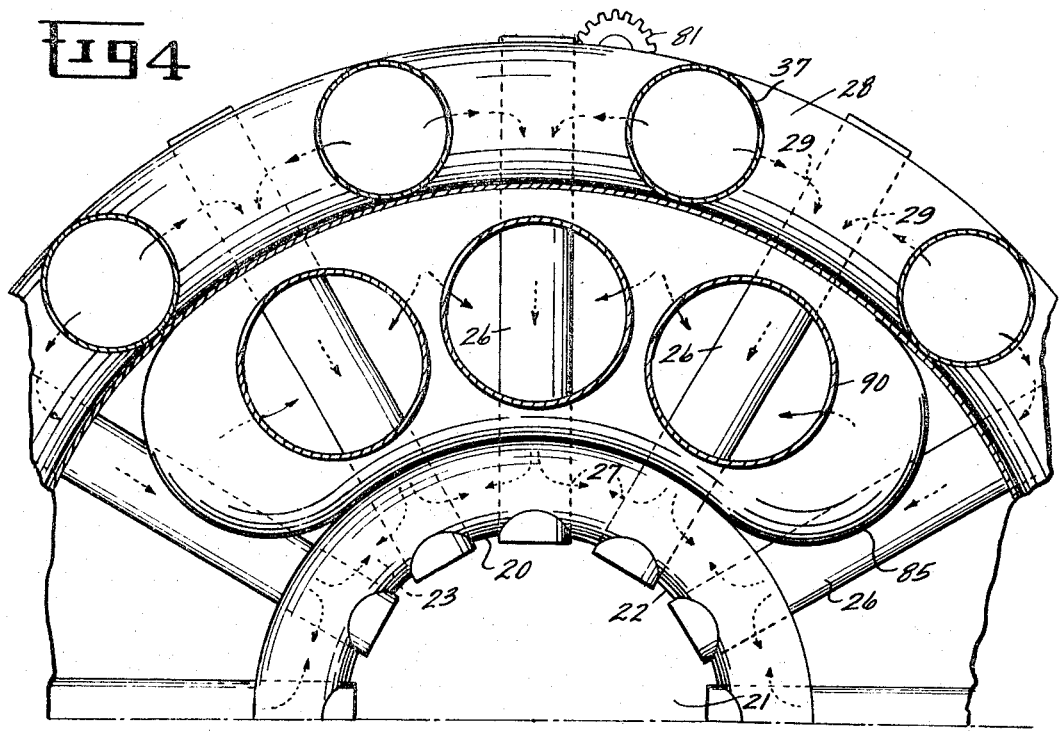
FIG. 4 is a view taken along viewing line 4—4 of FIG. 2.

Turning now to FIGS. 2, 3, and 4, it will be seen that an arcuate header 85 is supported by a portion of the upstream frame struts 26, the struts extending through the header 85 but not communicating therewith. As best shown by FIG. 2, the header 85 opens in the downstream direction so as to communicate with the upstream ends of the ducts 71 and 72 comprising the arcuate portion of the rotor assembly in alignment with the header 85. Since the rotor assembly is rotating during operation, the particular heat exchange units comprising this first arcuate portion of the heat exchange array 70 are continually changing. At any particular time, the heat exchange units not comprising the first arcuate portion comprise a second arcuate portion directly communicating with the discharge portion of the power turbine 17 through an exhaust duct 87, as shown by FIG. 3. In addition to the annular seal 59 described at an earlier point in this specification, suitable seal means are provided to prevent leakage from the header 85 to either atmosphere or to the exhaust duct 87 through the axial space between the header 85 and the rotor assembly. A particularly effective seal arrangement is illustrated, the arrangement being described and claimed in the copending Paradise et al. application identified above.

With reference now to FIGS. 1–3, an annulus 90 surrounds the exhaust duct 87, the annulus 90 communicating with the header 85 and the downstream annular section 43 of the extraction annulus 40 and the combustor 14 by means of circumferentially spaced, axial ducts 91. Bellows 92 are provided in the ducts 91 to relieve stresses therein.

In this respect, it will be noted that the annulus 90 and the ducts 91 do not comprise part of the support frame, but serve merely as a fluid flow manifold means.

Figure 5:
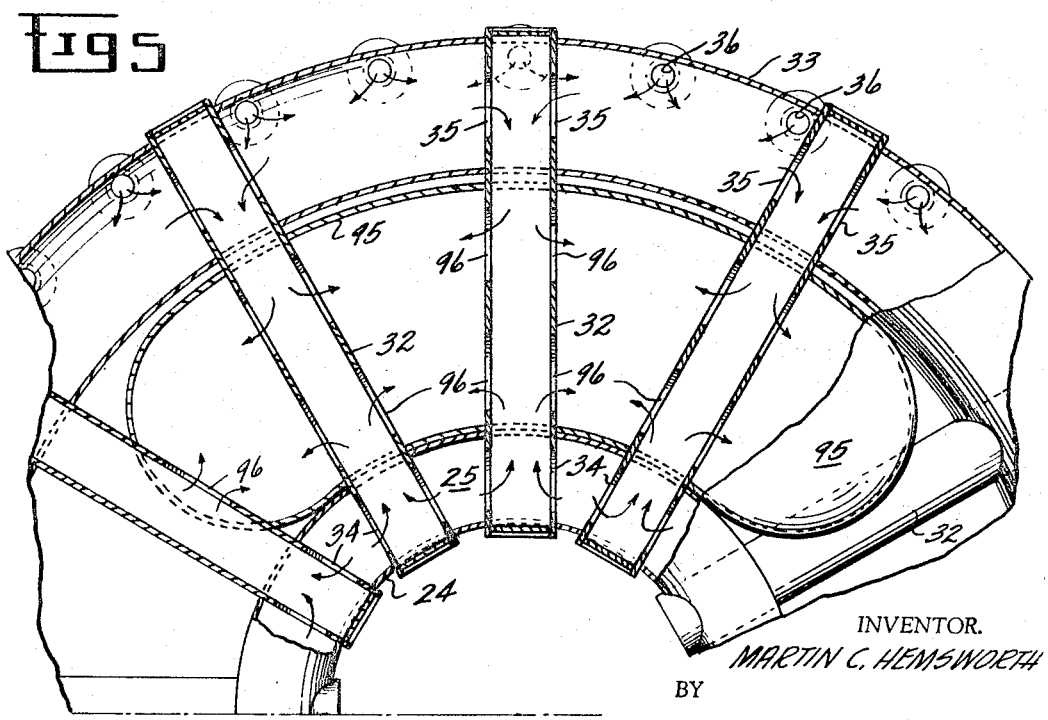
FIG. 5 is a view taken along viewing line 5—5 of FIG. 2.

Turning now to FIGS. 2, 3, and 5, an arcuate header 95 is supported by a portion of the downstream frame struts 32, the struts extending through the header 95 and communicating therewith through openings 96 in the struts. As best shown by FIG. 2, the header 95 opens in the upstream direction so as to communicate with the downstream ends of the ducts 71 and 72 comprising the first arcuate portion of the rotor assembly as described previouslly. At any particular time, the ducts 71 and 72 comprising the second arcuate portion directly communicate with atmosphere through an exhaust duct 97. In addition to the annular seal 60 described at an earlier point in this specification, suitable seal means are provided to prevent leakage from the header 95 to the exhaust duct 97 and atmosphere between the header 95 and the rotor assembly. As in the case of the upstream header 85, a particularly effective seal arrangement is that described and claimed in the copending Paradise et al. application.

With the structural arrangement of the gas turbine powerplant 10 now understood, its operation will be described. The relatively cool compressed air from the compressor 13 is supplied through the extraction annulus 40 and the ducts 37 to the upstream annulus 28 where the flow divides, a first portion flowing through the axial ducts 36 to the downstream annulus 33 and a second portion flowing radially inward through the struts 26 to the plenum 23. The compressed air entering the plenum 23 is again divided, a first portion leaking through the bearing 52, then flowing along the inner surface of the rotor shell 54 through a passage defined by the shell 54 and guide means 105 on the support member 20, and finally leaking through the bearing 53 to the plenum 25. The second portion of the air entering the plenum 23 flows outwardly through the struts 55 to the annulus 56, then through the axial ducts 61 to the annulus 59, and finally inwardly through the struts 58 to the plenum 25. From the annulus 33 and the plenum 25, the compressed air enters the downstream header 95 through the struts 32 and the openings 96 therein. It will, of course, occur to those skilled in the art that the flow passages of the various elements comprising the support frame and the rotor assembly should be sized such that each has the proper quantity of air flowing therethrough. From the foregoing, it will be seen that the structural elements comprising both the support frame and the rotor assembly form manifold means for supplying compressed air to the header 95, the elements being maintained at low temperature during operation because of the relatively cool compressed air flowing therethrough. Consequently, both the support frame and the rotor assembly display a high degree of dimensional stability during operation. This dimensional stability makes effective sealing much more easily accomplished. In the event that for some reason the rotor were to stop rotating during operation, the compressed air flowing through the various support elements would also prevent overheating of the elements stalled in the hot gas path.

To complete the description of the gas turbine powerplant 10, the compressed air from the downstream header 95 flows through the first arcuate portion of the heat exchange array 70 to the upstream header 85. The heated air is then supplied to the combustor 14 through the ducts 91 and the extraction annulus 40. While the compressed air is flowing through the heat exchange units comprising the first arcuate portion of the heat exchange array 70, hot exhaust products from the exhaust duct 87 are flowing through the heat exchange units comprising the second arcuate portion of the array to heat up the matrices 75 and 76, the cooled exhaust products being discharged to atmosphere through the exhaust duct 97. Since the rotor assembly is rotating and the heat exchange units comprising the first and second arcuate portions of the heat exchange array 70 are therefore continually changing, heat is continually transferred from the high temperature combustion products to the compressed air entering the combustor 14. By providing dimensional stability, and thereby facilitating effective sealing, the thermal efficiency of the powerplant may be increased through use of the present invention.

Because of the substantially stress-free character of the structure, just described, the elements may be of relatively lightweight construction. However, the total weight of a regenerator is also affected by its overall size. It will be noted that the regenerative arrangement illustrated by FIGS. 1–7 directs all of the exhaust fluid through the axial ducts 71 and 72 under all operating conditions. It is therefore a requirement that the regenerator be large enough to handle the maximum flow rates which occur when the powerplant is operating under full load conditions. This type of powerplant is thus most efficient when operating at full power. During part power operation, both the capacity and weight are greater than required and, as a result, the powerplant efficiency is reduced at part power. It is well known, however, that some gas turbine engines are normally run at part power settings. It is therefore sometimes desirable to design the regenerator to provide most efficient operation at part power. A regenerative powerplant utilizing this invention for efficient part power operation is illustrated by FIG. 8.

The powerplant of FIG. 8 is substantially similar to the one illustrated by FIGS. 1–7, similar elements being denoted by the same numerals. The fluid handling elements comprising the recuperator are, however, sized to accommodate only a portion of the full load gas flow. The structural elements as well as the fluid handling elements are thus substantially smaller and lighter than the counterpart elements of the powerplant shown by FIGS. 1–7. When the flow of exhaust fluids is greater than can be accommodated through the axial ducts 71 and 72, valve plates 110 at the downstream end of the cylindrical support member 20 are moved from the closed positions shown by solid lines in FIGS. 8 to the open positions illustrated by broken lines by means of a suitable operating mechanism such as a hydraulic cylinder and piston arrangement 111. With the valve plates 110 in the open positions, the excess flow at high power settings can be bypassed through the interior of the support member 20 which thus serves as a bypass exhaust duct. This arrangement is thus most efficient at normal part power operation.

From the foregoing, it will be appreciated that the structural arrangement of this invention has a high degree of dimensional stability during powerplant operation. This dimensional stability contributes to the maintenance of close seal clearances and low leakage without creating substantial thermal stresses.

It will be understood that the invention is not limited to the specific details of construction and arrangement of the embodiments illustrated and described herein since changes and modifications will be obvious to those skilled in the art. It is therefore intended to cover in the appended claims all such changes and modifications which may occur to those skilled in the art without departing from the true spirit and scope of the invention.

What is claimed as new and is desired to secure by Letters Patent of the United States is:

1. In a gas turbine powerplant having a compressor, a combustor, and a turbine for driving said compressor, a rotary regenerator comprising:
    stationary support means including an axial support member, said support means having fluid passages therein,
    a rigid rotor peripherally surrounding and rotatably mounted on said support member, said rotor having axially spaced upstream and downstream ends and fluid passages therein,
    an annular heat exchange array comprising a plurality of circumferentially spaced, heat exchange matrices mounted in said rotor and extending axially between the upstream and downstream ends of said rotor, upstream and downstream stationary headers adjacent the upstream and downstream ends, respectively, of said rotor communicating with a first arcuate portion only of said annular heat exchange array, first manifold means interconnecting the discharge portion of said compressor and one of said headers, the fluid passages within said support means and said rigid rotor being interconnected and forming at least a portion of said first manifold means, whereby said support means and said rigid rotor are maintained at a relatively cool temperature by the compressor discharge air within said fluid passages, second manifold means interconnecting the inlet portion of said combustor and the other of said headers, exhaust means interconnecting in serial flow arrangement the discharge portion of said turbine, a second arcuate portion of said annular heat exchange array, and discharge means for discharging gas to atmosphere, and means for rotating said rotor and said annular heat exchange array to continually change the heat exchange passages comprising said first and second arcuate portions of said heat exchange array, whereby heat is transferred from hot exhaust gases flowing through said second arcuate portion to compressed air flowing through said first arcuate portion.

2. A rotary regenerator as defined by claim 1 in which said axial support member forms a separate exhaust duct for discharging gas directly to atmosphere from the discharge portion of said turbine, valve means being provided in said separate exhaust duct for controlling the flow of hot exhaust gases therethrough.

3. In a gas turbine powerplant including a compressor having inlet and discharge portions, a combustor having inlet and discharge portions, and a turbine having inlet and outlet portions, the discharge portion of said combustor communicating with the inlet portion of said turbine, a rotary regenerator comprising:

an annular support frame including a cylindrical support member, a rigid rotor within said support frame peripherally surrounding and rotatably mounted on said support member, said rotor having axially spaced upstream and downstream ends, an annular heat exchange array comprising a plurality of circumferentially spaced, flexible heat exchange units extending axially between the upstream and downstream ends of said rotor, each of said heat exchange units forming a fluid flow passage between said ends, means adjacent said upstream and downstream ends of said rotor supporting said heat exchange units from said rotor and sealing the spaces between said heat exchange units to prevent fluid flow therethrough.

upstream and downstream stationary headers adjacent the upstream and downstream ends, respectively, of said rotor communicating with a first arcuate portion only of said annular heat exchange array, first manifold means interconnecting the discharge portion of said compressor and said downstream header, second manifold means interconnecting the inlet portion of said combustor and said upstream header, a first exhaust duct interconnecting the discharge portion of said turbine and the upstream ends of a second arcuate portion only of said annular heat exchange array, a second exhaust duct for discharging gas to atmosphere from the downstream end of said second arcuate portion of said annular heat exchange array, and means for rotating said rotor and said annular heat exchange array to continually change the heat exchange units comprising said first and second arcuate portions of said heat exchange array, whereby heat is transferred from hot exhaust gases flowing through said second arcuate portion to compressed air flowing through said first arcuate portion, and wherein said support frame and said rigid rotor are each comprised of a plurality of structural members having interconnected fluid passages therein forming said first manifold means.

4. A rotary regenerator as defined by claim 3 in which said support frame comprises:

said cylindrical support member, means forming with said support member and said rigid rotor an annular plenum at the upstream end of said rotor, means forming with said support member and said rigid rotor an annular plenum at the downstream end of said rotor, said cylindrical support member forming with said rigid rotor a first fluid passage between said upstream plenum and said downstream plenum inwardly of said rigid rotor, a plurality of hollow struts communicating with said upstream plenum and extending radially outwardly therefrom upstream of said rigid rotor, selected ones of said upstream frame struts extending through and supporting said upstream header, a hollow annulus communicating with and interconnecting the outer ends of said upstream frame struts, a plurality of hollow struts communicating with said downstream plenum and extending radially outward therefrom downstream of said rigid rotor, selected ones of said downstream frame struts extending through, supporting, and communicating with said downstream header, a hollow annulus communicating with and interconnecting the outer ends of said downstream frame struts, a plurality of circumferentially spaced, axial ducts communicating with and interconnecting said upstream and downstream annuli, and a plurality of circumferentially spaced ducts communicating with and interconnecting the discharge portion of said compressor and said upstream annulus.

5. A rotary regenerator as defined by claim 4 in which said rigid rotor comprises:

a cylindrical shell surrounding and rotatably mounted on said support member in radially spaced relation thereto so as to form with said support member said first fluid passage between said upstream plenum and said downstream plenum, a plurality of hollow struts connected to said cylindrical shell and extending radially outward therefrom adjacent the upstream end of said shell, said struts communicating with said upstream plenum and being located in the circumferential spaces between adjacent heat exchange units, a hollow annulus communicating with and interconnecting the outer ends of said upstream rotor struts, a plurality of hollow struts connected to said cylindrical shell and extending radially outward therefrom adjacent the downstream end of said shell, said struts communicating with said downstream plenum and being located in the circumferential spaces between adjacent heat exchange ducts, a hollow annulus communicating with and interconnecting the outer ends of said downstream rotor struts, and a plurality of axial ducts interconnecting said upstream and downstream rotor annuli, said rotor struts, said rotor annuli, and said axial rotor ducts forming a second fluid passage between said upstream plenum and said downstream plenum, whereby said support frame and said rigid rotor cooperate to form said first manifold means for supplying compressed air to said downstream header.

6. A rotary regenerator as defined by claim 5 including sealing means between said headers and said rotor to reduce leakage threbetween and between said first and second arcuate portions of said heat array.

7. A rotary regenerator as defined by claim 6 in which said cylindrical support member forms a third exhaust duct for discharging gas directly to atmosphere from the discharge portion of said turbine, valve means being provided in said third exhaust duct for controlling the flow of hot exhaust gases therethrough.

References Cited

UNITED STATES PATENTS

| | | | |
|---|---|---|---|
| 2,680,598 | 6/1954 | Trulsson et al. | 165—9 |
| 2,757,907 | 8/1956 | Williams | 165—9 |
| 2,955,071 | 10/1960 | Eriksson | 165—9 |
| 3,039,265 | 6/1962 | Williams et al. | 60—39.51 |
| 3,116,785 | 1/1964 | Bubniak et al. | 165—9 |

CARLTON R. CROYLE, *Primary Examiner.*